(12) United States Patent
Shibata et al.

(10) Patent No.: US 9,541,289 B2
(45) Date of Patent: Jan. 10, 2017

(54) GAS COOLER, GASIFICATION FURNACE, AND INTEGRATED GASIFICATION COMBINED CYCLE FOR CARBON-CONTAINING FUEL

(75) Inventors: Yasunari Shibata, Tokyo (JP); Osamu Shinada, Tokyo (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 567 days.

(21) Appl. No.: 14/113,277

(22) PCT Filed: Jul. 13, 2012

(86) PCT No.: PCT/JP2012/067974
§ 371 (c)(1),
(2), (4) Date: Oct. 22, 2013

(87) PCT Pub. No.: WO2013/008924
PCT Pub. Date: Jan. 17, 2013

(65) Prior Publication Data
US 2014/0041358 A1    Feb. 13, 2014

(30) Foreign Application Priority Data

Jul. 14, 2011 (JP) .................................. 2011-156085

(51) Int. Cl.
*F23J 15/06* (2006.01)
*F01K 23/10* (2006.01)
(Continued)

(52) U.S. Cl.
CPC ................. *F23J 15/06* (2013.01); *C10J 3/485* (2013.01); *C10J 3/723* (2013.01); *C10J 3/78* (2013.01);
(Continued)

(58) Field of Classification Search
CPC .............. F23J 15/06; F02C 3/22; F01K 23/10; F01K 23/068; F22B 1/1815; F22B 1/1546; Y02P 20/13; Y02P 20/129; Y02E 20/16; Y02E 20/18; C10J 3/78; C10J 3/723; C10J 3/86; C10J 3/485; C10J 2300/1675; C10J 2300/1846; C10J 2300/1671; C10J 2300/1807; C10J 2300/093; C10J 2300/0906
(Continued)

(56) References Cited

U.S. PATENT DOCUMENTS 4,487,139 A * 12/1984 Warner ................ B01D 53/002
110/215
4,526,112 A * 7/1985 Warner ................ B01D 53/002
110/205
(Continued)

FOREIGN PATENT DOCUMENTS

CN        1050928        4/1991
CN        1667338        9/2005
(Continued)

OTHER PUBLICATIONS

Written Opinion of the International Searching Authority issued Aug. 21, 2012 in International (PCT) Application No. PCT/JP2012/067974.
(Continued)

*Primary Examiner* — Carlos A Rivera
(74) *Attorney, Agent, or Firm* — Wenderoth, Lind & Ponack, L.L.P.

(57) ABSTRACT

Provided is a gas cooler for cooling a produced gas on a side from which the produced gas exits, the produced gas being produced by partially oxidizing and gasifying a carbon-containing fuel in a gasification furnace inside a pressure vessel. A distance (SL) between tubes of a tube bundle of a heat exchanger provided inside the gas cooler is set such that
(Continued)

the tubes are in contact with each other or adjacent to each other in a gas-flow direction of the produced gas. Since the tubes are in contact with each other or adjacent to each other, a particle flowing with the gas flow is only deposited as a deposited particle in a concave portion between the tubes, whereby the decrease in heat exchange efficiency caused by particle deposition can be suppressed.

5 Claims, 12 Drawing Sheets

(51) Int. Cl.
　　*F02C 3/22*　　　(2006.01)
　　*C10J 3/86*　　　(2006.01)
　　*C10J 3/78*　　　(2006.01)
　　*F01K 23/06*　　(2006.01)
　　*F22B 1/18*　　　(2006.01)
　　*C10J 3/48*　　　(2006.01)
　　*C10J 3/72*　　　(2006.01)

(52) U.S. Cl.
　　CPC .............. *C10J 3/86* (2013.01); *F01K 23/068* (2013.01); *F01K 23/10* (2013.01); *F02C 3/22* (2013.01); *F22B 1/1815* (2013.01); *F22B 1/1846* (2013.01); *C10J 2300/093* (2013.01); *C10J 2300/0906* (2013.01); *C10J 2300/1671* (2013.01); *C10J 2300/1675* (2013.01); *C10J 2300/1807* (2013.01); *C10J 2300/1846* (2013.01); *Y02E 20/16* (2013.01); *Y02E 20/18* (2013.01); *Y02P 20/124* (2015.11); *Y02P 20/129* (2015.11); *Y02P 20/13* (2015.11)

(58) Field of Classification Search
　　IPC ............................................ Y02P 20/13,20/129
　　See application file for complete search history.

(56) References Cited

U.S. PATENT DOCUMENTS

| | | | | | |
|---|---|---|---|---|---|
| 4,557,202 | A | * | 12/1985 | Warner | B01D 53/002 110/216 |
| 4,590,868 | A | * | 5/1986 | Ishihara | F01K 23/067 110/216 |
| 4,669,530 | A | * | 6/1987 | Warner | B01D 53/002 165/111 |
| 4,776,391 | A | * | 10/1988 | Warner | B01D 53/002 165/111 |
| 4,909,318 | A | * | 3/1990 | Ymse | B01D 5/0006 122/20 B |
| 7,444,947 | B2 | * | 11/2008 | Katayama | C10J 3/30 110/341 |
| 7,507,381 | B2 | * | 3/2009 | Muramoto | F23G 5/46 422/173 |
| 7,691,349 | B2 | * | 4/2010 | Muramoto | F23G 5/46 423/210 |
| 2010/0107595 | A1 | * | 5/2010 | Hardwicke | F01K 23/10 60/39.182 |

FOREIGN PATENT DOCUMENTS

| | | |
|---|---|---|
| JP | 10-88154 | 4/1998 |
| JP | 2001-254086 | 9/2001 |
| JP | 2003-014397 | 1/2003 |
| JP | 2004-51915 | 2/2004 |
| JP | 2006-214712 | 8/2006 |
| JP | 2008-145061 | 6/2008 |
| JP | 2010-285564 | 12/2010 |

OTHER PUBLICATIONS

Japanese Notice of Allowance issued Jul. 22, 2014 in corresponding Japanese Patent Application No. 2013-524006 with English translation.
Chinese Notice of Allowance issued Oct. 22, 2015 in corresponding Chinese Patent Application No. 201280019901.4 with English translation.
Chinese Office Action issued Jul. 23, 2014 in corresponding Chinese Patent Application No. 201280019901.4 with English translation.
International Search Report issued Aug. 21, 2012 in International (PCT) Application No. PCT/JP2012/067974 with Engilsh translation.
Written Opinion of the International Searching Authority issued Aug. 21, 2012 in International (PCT) Application No. PCT/JP2012/067974 with Engilsh translation.
Written Opinion of the International Searching Authority issued Aug.t 21, 2012 in International (PCT) Application No. PCT/JP212/067974.

* cited by examiner

DROP

DROP

GAS COOLER, GASIFICATION FURNACE, AND INTEGRATED GASIFICATION COMBINED CYCLE FOR CARBON-CONTAINING FUEL

FIELD

The present invention relates to a gas cooler of a carbon-containing fuel gasification furnace, a gasification furnace, and an integrated gasification combined cycle for a carbon-containing fuel.

BACKGROUND

An integrated gasification combined cycle (IGCC) has conventionally been developed and put into practical use in order to improve power generation efficiency in a coal-fired power plant, for example.

The integrated gasification combined cycle has advantages in that it uses coal resources with abundant reserves, an air pollutant such as carbon dioxide is emitted less since the thermal efficiency is higher than that of the conventional pulverized coal-fired power generation, and ashes of coal is discharged as vitreous molten slag to have a smaller volume. Accordingly, the development of an integrated gasification combined facility is in progress as a leading technology of the future coal-fired power generation.

The integrated gasification combined cycle here includes: a gas turbine which operates with a fuel that is a coal gas obtained by gasifying coal; and a steam turbine which operates with steam obtained by recovering exhausted heat from the gas turbine (Patent Literature 1).

In recent years, the development of the integrated gasification combined cycle using a pressurized coal gasification furnace is in progress in order to improve power generation efficiency at a coal-fired power plant (Patent Literature 2).

Unlike a conventional combustion boiler, the pressurized coal gasification furnace has a gasification furnace and a gas cooler that are provided in a pressure vessel, the pressure in which is set to 3 MPa, for example.

CITATION LIST

Patent Literature

Patent Literature 1: Japanese Patent Application Laid-open No. 2010-285564
Patent Literature 2: Japanese Patent Application Laid-open No. 2006-214712

SUMMARY

Technical Problem

However, there exists a problem that heat transfer efficiency of a number of tube bundles within a heat exchanger included in the gas cooler is decreased due to particles being deposited because the concentration of the particles (such as ashes in the coal, unburned) in the gasified, produced gas is high in the gas cooler installed at the exit of the coal gasification furnace inside the pressure vessel.

In general, the tubes are arranged at some interval from one another along a height direction of the gas cooler (a gas-flow direction of the produced gas) in order to improve the heat transfer efficiency. However, the particles are deposited instantly in the heat exchanger included in the gas cooler at the exit of the gasification furnace under the atmosphere with high particle concentration, whereby the heat transfer efficiency is decreased in a short period of time.

Now, as a way to suppress the decrease in the heat transfer efficiency, a dust remover such as a soot blower which removes the particles deposited on a heat transfer surface of the tubes is installed to remove the deposited particles by blowing steam against the surface at a high speed. Under the atmosphere with high particle concentration, however, the dust removal is performed more frequently so that it is required to improve the operational reliability of the dust remover.

In particular, auxiliary equipment such as a highly reliable pressure seal is required when the soot blower or the like is repeatedly inserted and pulled out into/from the tube bundle of the gas cooler in the pressure vessel, thereby causing a problem that the equipment cost runs up substantially.

Another problem is that, when the deposited particle is sintered like ash, there can be caused not only the decrease in the heat transfer efficiency but clogging in a gas passage within the gas cooler due to sintering and adhesion of the deposited particle, unless the frequency of dust removal is set and kept properly at all times where the ambient temperature is in the range of sintering temperature.

Accordingly, in order to perform dust removal less frequently (such as every eight hours), the tubes in the heat exchanger are installed in a larger quantity in advance on the assumption that the particles are deposited to decrease the heat transfer efficiency, thereby causing a problem that the volume of the heat exchanger is increased.

It is therefore desired the emergence of a gas cooler in which the amount of particles deposited onto the tube bundle of the heat exchanger is decreased as well as the fluctuation in the heat exchange efficiency is small.

The present invention has been made in consideration of the aforementioned problems. An object of the present invention is to provide a gas cooler of a carbon-containing fuel gasification furnace, a gasification furnace, and an integrated gasification combined cycle for a carbon-containing fuel, where the amount of particles deposited is decreased as well as the fluctuation in the heat exchange efficiency is small in the gas cooler.

Solution to Problem

A first aspect of the present invention which solves the aforementioned problems is a gas cooler for cooling a produced gas on a side from which the gas exits, the produced gas being produced by partially oxidizing and gasifying a carbon-containing fuel in a gasification furnace within a pressure vessel. The distance between tubes of a tube bundle of a heat exchanger provided in the gas cooler is set such that the tubes are in contact with each other or adjacent to each other in a gas-flow direction of the produced gas.

A second aspect of the present invention is the gas cooler provided in the first aspect of the invention in which a ratio (SL/d) of a distance (SL) between the tubes of the tube bundle in the gas-flow direction of the produced gas to an outer diameter (d) of the tube is larger than 1 and 1.4 or smaller.

A third aspect of the present invention is the gas cooler provided in the first or second aspect of the invention in which the temperature of the produced gas within the gas cooler is equal to an ash melting point or lower, and the dust concentration falls within the range of 50 to 20,000 g/m³.

A fourth aspect of the present invention is the gas cooler provided in any one of the first to third aspects of the invention in which the pressure inside the pressure vessel is 0.5 MPa to 10 MPa.

A fifth aspect of the present invention is a gasification furnace including any one of the first to fourth gas coolers.

A sixth aspect of the present invention is an integrated gasification combined cycle for a carbon-containing fuel which includes: a gasification furnace including any one of the first to fourth gas coolers; gas turbine equipment to which the produced gas obtained from the gasification furnace is supplied as fuel; and an exhausted heat recovery steam generator which recovers exhausted heat from a flue gas produced in the gas turbine equipment.

A seventh aspect of the present invention is the integrated gasification combined cycle for a carbon-containing fuel provided in the sixth aspect of the invention in which the integrated gasification combined cycle further includes steam turbine equipment to which obtained steam is supplied.

Advantageous Effects of Invention

According to the present invention, the tubes are in contact with each other or adjacent to each other so that the particles flowing with the gas are deposited as deposited particles only in a concave portion between the tubes, whereby the decrease in the heat exchange efficiency caused by the particle deposit can be suppressed. As a result, there is not required a highly reliable dust remover or no need to consider a room for the decrease in the heat transfer efficiency.

DESCRIPTION OF EMBODIMENTS

The present invention will now be described in detail with reference to the drawings. Note that the present invention is not to be limited to the embodiments but includes a combination of the respective embodiments where a plurality of embodiments is provided. Moreover, the components in the embodiments below include ones that can easily be envisioned by those skilled in the art or ones that are substantially identical.

First Embodiment

A gas cooler of a coal gasification furnace according to the embodiment of the present invention will be described with reference to the drawings.

Figure 1:
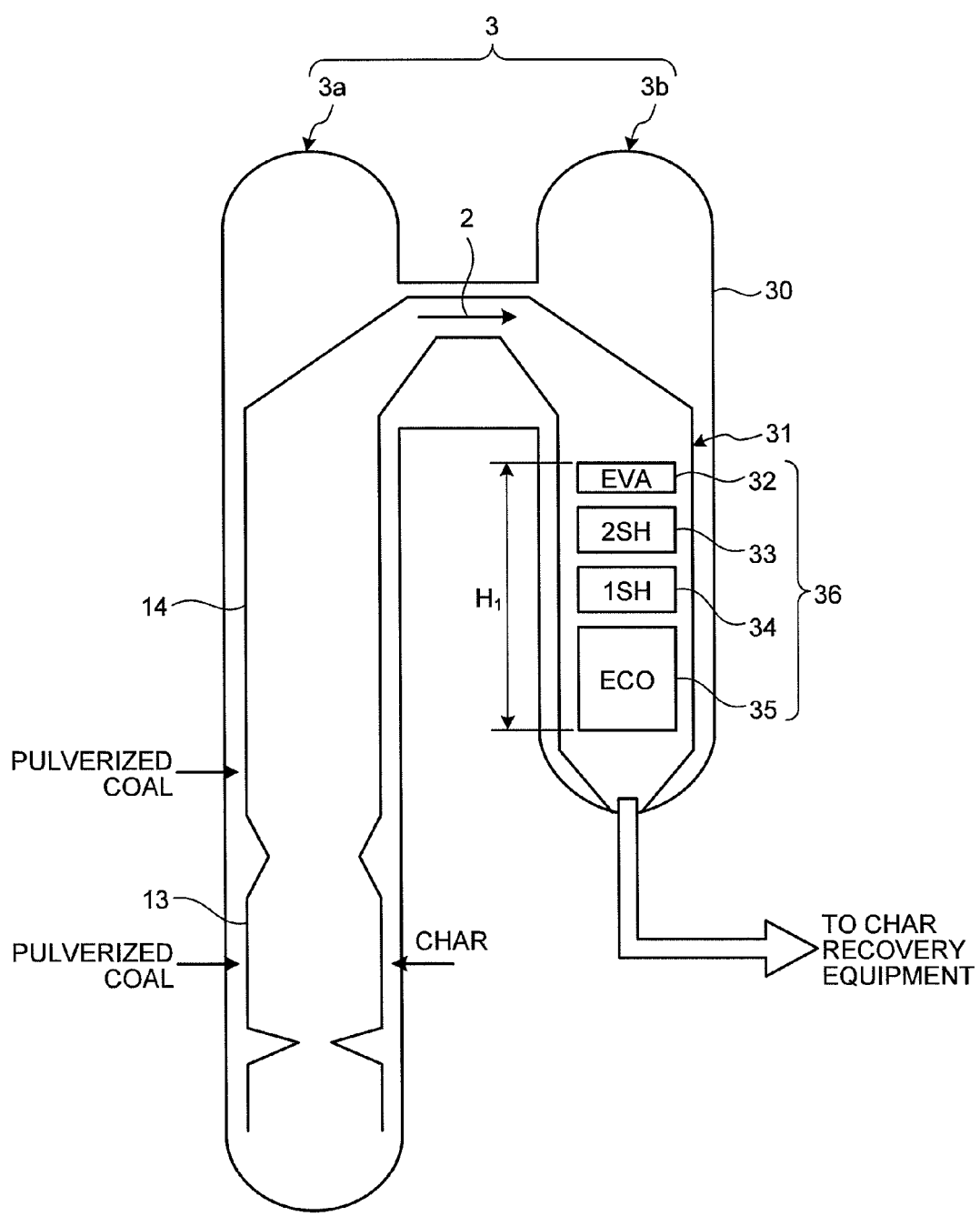
FIG. 1 is a schematic diagram of a coal gasification furnace according to the present embodiment.
Figure 2:
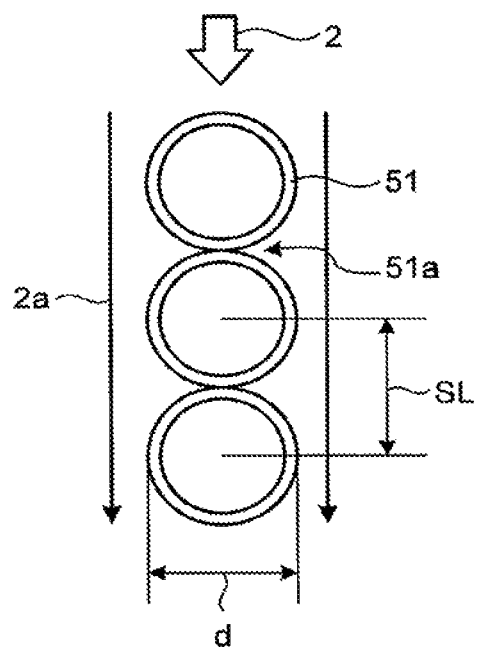
FIG. 2 is a diagram illustrating the arrangement of a tube in a heat exchanger according to the present embodiment.
Figure 3:
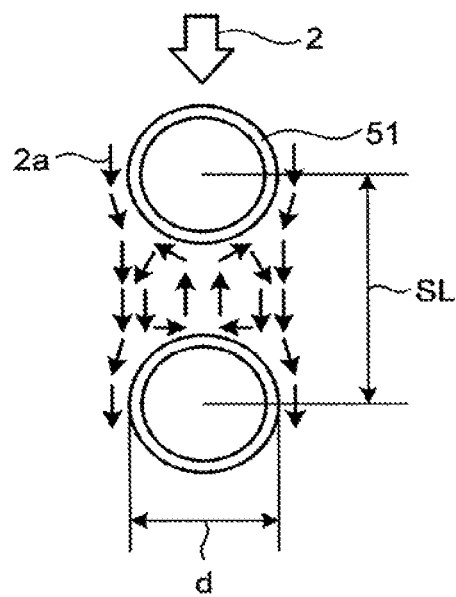
FIG. 3 is a diagram illustrating the arrangement of a tube in a heat exchanger according to conventional technology.
Figure 4:
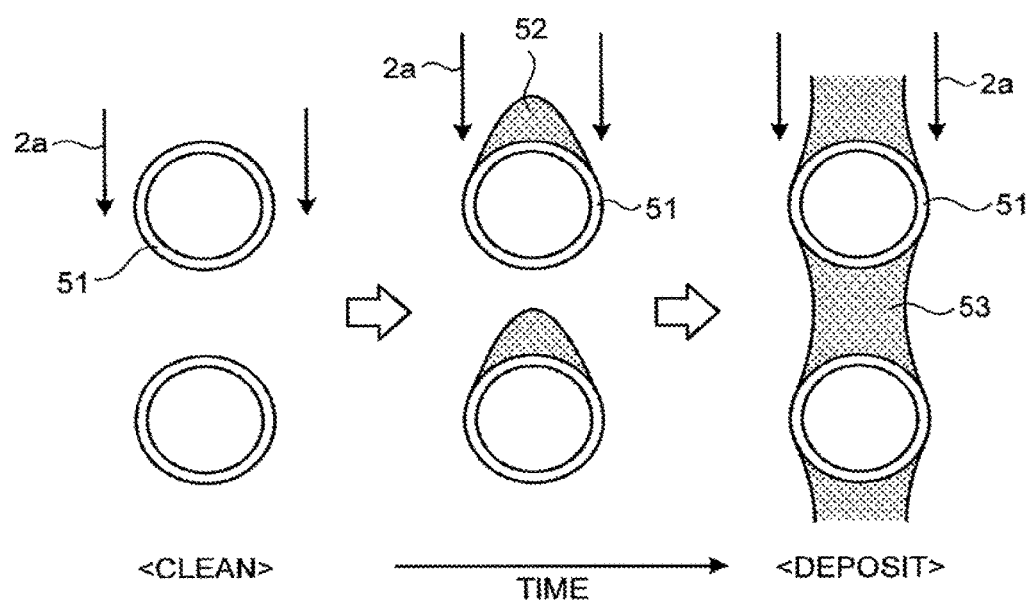
FIG. 4 is a diagram illustrating a deposit state of a particle onto the tube in the heat exchanger according to the conventional technology.
Figure 5:
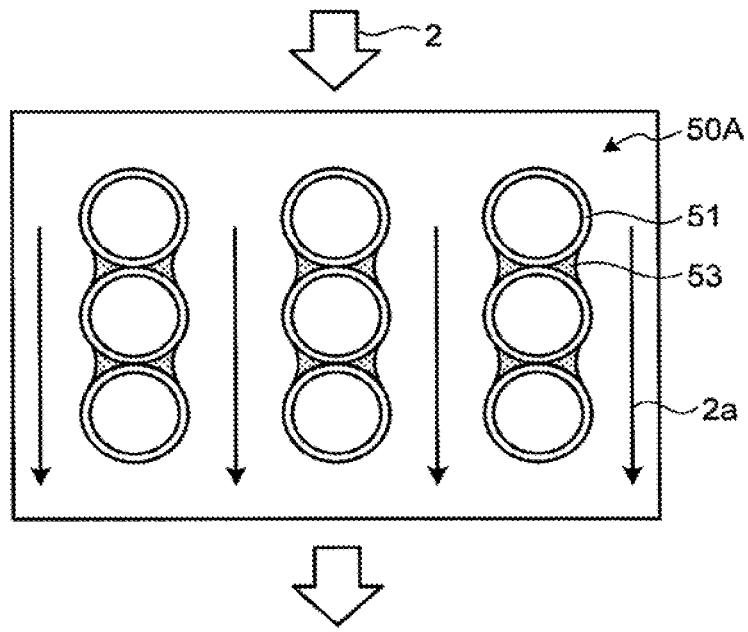
FIG. 5 is a schematic diagram illustrating the arrangement of a tube bundle in the heat exchanger according to the present embodiment.
Figure 6:
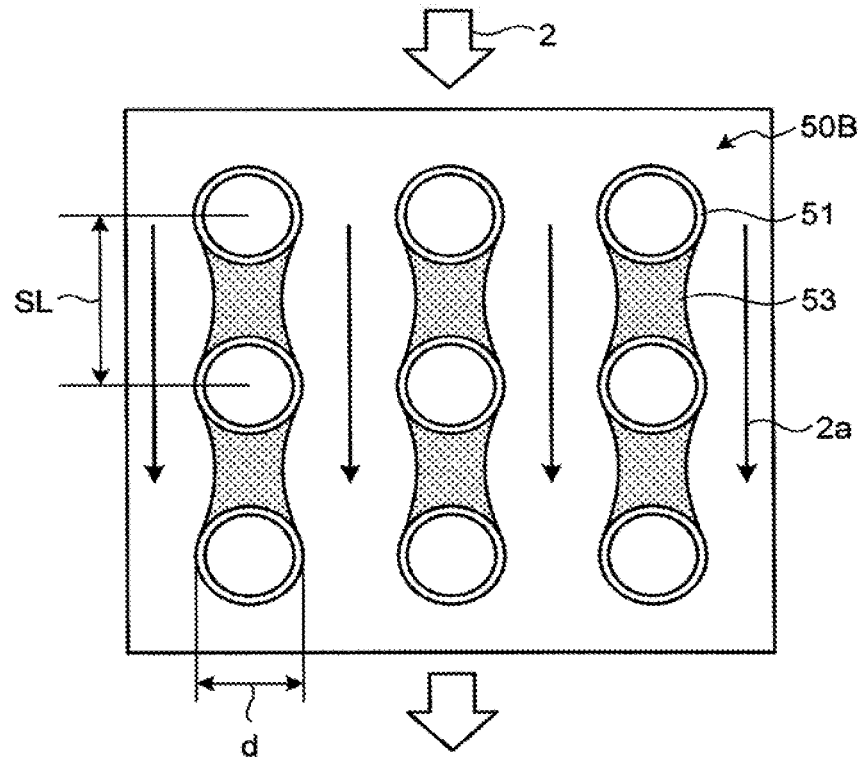
FIG. 6 is a schematic diagram illustrating the arrangement of a tube bundle in the heat exchanger according to the conventional technology.
Figure 7:
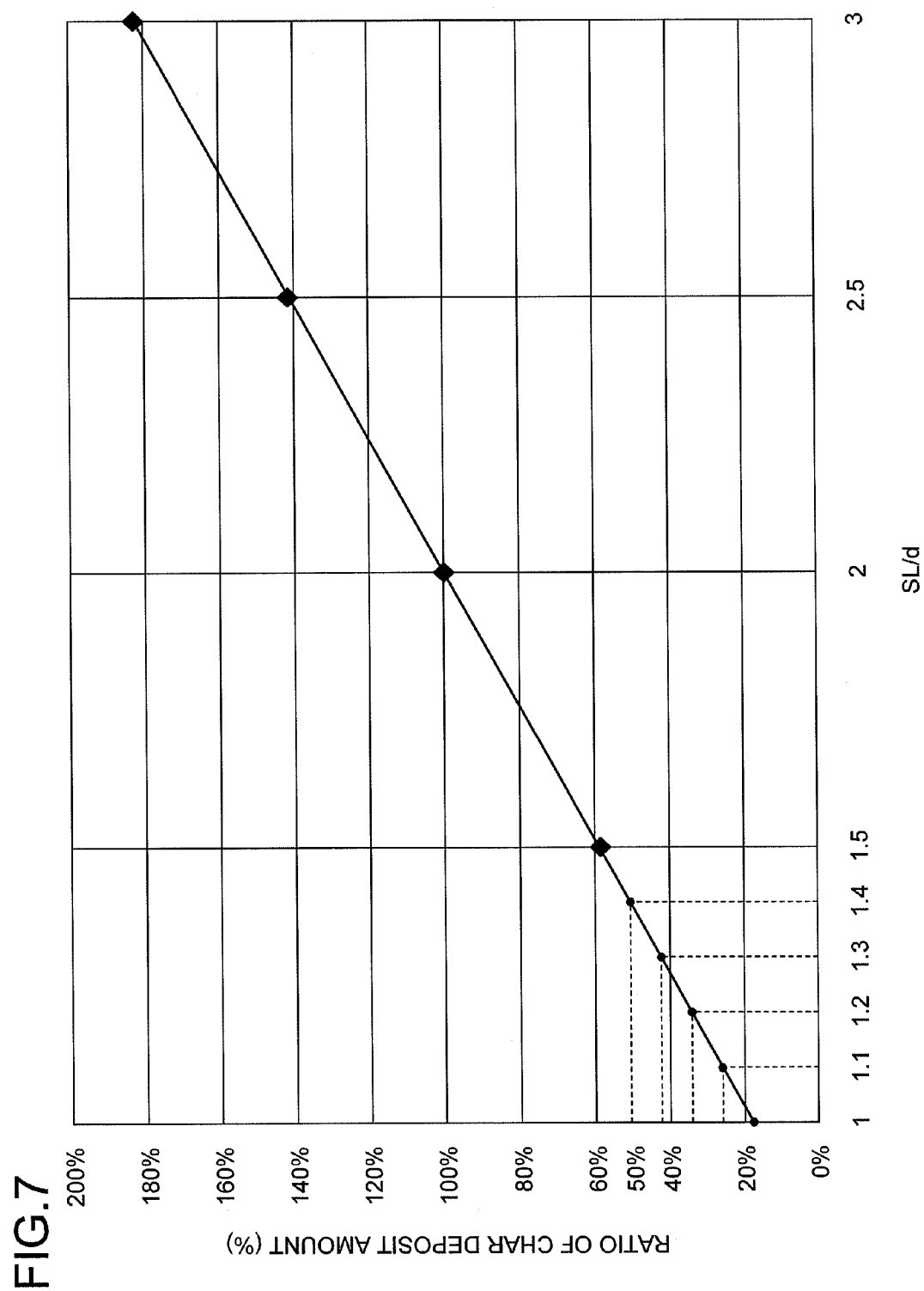
FIG. 7 is a graph illustrating the relationship between SL/d and a ratio of char deposit amount (%).
Figure 8:
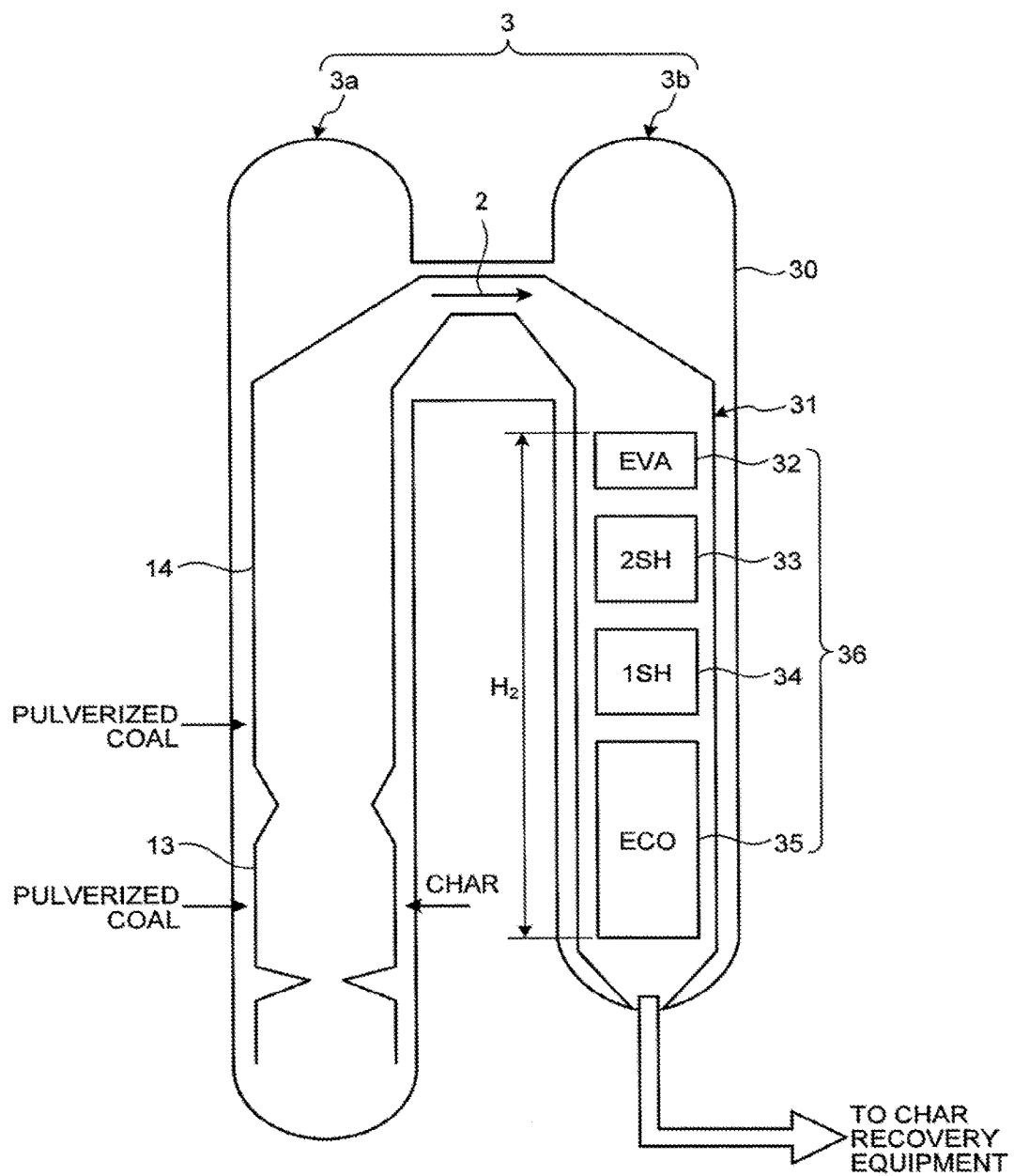
FIG. 8 is a schematic diagram illustrating a coal gasification furnace according to the conventional technology.

FIG. 1 is a schematic diagram of the coal gasification furnace according to the present embodiment. FIG. 2 is a diagram illustrating the arrangement of a tube in a heat exchanger according to the present embodiment. FIG. 3 is a diagram illustrating the arrangement of a tube in a heat exchanger according to conventional technology. FIG. 4 is a diagram illustrating a deposit state of a particle onto the tube in the heat exchanger according to the conventional technology. FIG. 5 is a schematic diagram illustrating the arrangement of a tube bundle in the heat exchanger according to the present embodiment. FIG. 6 is a schematic diagram illustrating the arrangement of a tube bundle in the heat exchanger according to the conventional technology. FIG. 7 is a graph illustrating the relationship between SL/d and a ratio of char deposit amount (%). FIG. 8 is a schematic diagram illustrating a coal gasification furnace according to the conventional technology.

As illustrated in FIG. 1, a coal gasification furnace 3 according to the present embodiment includes a gasification part 3a which partially oxidizes and gasifies pulverized coal and a gas cooler 3b, where the gasification furnace 3a and the gas cooler 3b are provided in a pressure vessel 30 with the pressure equal to 3 MPa, for example.

A heat exchanger 36 is provided in a flue gas duct 31 inside the pressure vessel 30 along the flow of a high-temperature produced gas 2 (approximately 1,100 to 1,200° C., for example) that is produced by partial oxidation. The heat exchanger 36 cools the high-temperature gas down to approximately 450° C., for example, which is the temperature suitable for gas refining equipment (not illustrated) that is installed following coal gasification furnace equipment. The heat exchanger 36 further recovers thermal energy from the high-temperature gas.

Within the flue gas duct 31 to be a passage of the high-temperature produced gas 2, for example, the heat exchanger 36 includes an evaporator (EVA) 32, a secondary superheater (2SH) 33, a primary superheater (1SH) 34, and a coal economizer (ECO: economizer) 35 that are disposed in order from the top so that the heat exchanger absorbs heat from the high-temperature produced gas 2 flowing downward within the flue gas duct 31 and cools the gas.

The heat exchanger 36 is provided with a number of tubes that supply a coolant, where the tubes are arranged in three rows by three columns to constitute a tube bundle 50A as illustrated in FIG. 5. Note that FIG. 5 illustrates an example of the tube bundle. In reality, a number of tubes are arranged in accordance with the heat transfer capacity of the heat exchange performed by the gas cooler.

In the present embodiment, tubes 51 and 51 constituting the tube bundle are provided to come in contact with each other as illustrated in FIG. 2. A reference numeral 2a in the figure illustrates a gas flow.

The particle flowing with the gas flow is deposited as the deposited particle only in a concave portion 51a between the tubes that are in contact with each other, whereby the decrease in the heat exchange efficiency caused by deposition of the particle can be suppressed.

As a result, there is no highly reliable dust remover required or no need to consider a room for the decrease in the heat transfer efficiency.

In other words, as illustrated in FIGS. 3 and 6, the distance between the tubes in the heat exchanger of a conventional boiler facility has been set large (such as SL/d=2) in order to set the heat transfer efficiency while taking into account the deposition of the particle to some extent.

Each tube 51 in FIG. 6 is disposed in a checkerboard pattern to form a tube bundle 50B.

In the heat exchanger of the conventional boiler facility, the tubes are generally arranged in the checkerboard pattern with SL/d=2 and a predetermined interval kept between the tubes in order to exchange heat generated by the vortex flow of the gas going around the tube 51. This is because the ratio SL/d preferably has a value near "2" to have a large Nusselt number that is an index of how easily heat is transferred (refer to pp. 40 and 41 of "JSME Data Book: Heat Transfer (Third Edition)" by The Japan Society of Mechanical Engineers, 1975).

Now, the heat transfer efficiency is decreased when the tube with the ratio SL/d=2 is arranged in the gas cooler inside the pressure vessel as in the coal gasification furnace, because a particle deposit 53 is instantly deposited between the tube 51 and the tube 51 as illustrated in FIG. 4.

That is, as illustrated in FIG. 4, a particle 52 of dust not deposited onto the tube 51 in a clean state is, as time passes, first deposited on the tube 51 on the upstream side of the gas flow and gradually grows into the particle deposit 53 that is deposited in all the space between the tubes 51 due to a large amount of dust (char) contained in the produced gas 2.

This particle deposit 53 turns into a board in appearance and causes the heat transfer efficiency to decrease substantially.

In the present embodiment, on the other hand, the tubes 51 and 51 come in contact with each other by disposing another tube 51 in a gap between the tubes 51 and 51, so that the decrease in the heat transfer efficiency can be prevented and that the amount of particle deposited can be reduced.

In other words, the number of times the dust remover is inserted and pulled out can be decreased in the present embodiment when the tubes 51 and 51 are in contact with each other or adjacent to each other (the ratio SL/d is larger than 1 and 1.4 or smaller) to decrease the amount of the particle deposit 53 being deposited.

It is favorable that the distance between the tubes 51 and 51 is set at SL/d=smaller than 2 as it has been, SL/d=larger than 1.0 and 1.4 or smaller preferably, or SL/d=larger than 1.1 and 1.4 or smaller more preferably.

In the present invention as described above, the tubes 51 and 51 are in contact with each other when SL/d=1.0, while the tubes 51 and 51 are adjacent to each other when the distance between the tubes 51 and 51 arranged in the gas-flow direction corresponds to the ratio SL/d that is larger than 1.0 and 1.4 or smaller.

Note that it takes labor and cost to manufacture a real machine with the ratio SL/d=1.0 in a large-scale plant. In terms of the labor and the cost, it is preferred that the ratio SL/d be 1.1 or larger in manufacturing the machine by bending one or a plurality of tubes.

It is preferred that the ratio SL/d be set close to 1 because, as illustrated in FIG. 7, the concave portion 51a and the gap between the adjacent tubes 51 and 51 become smaller as the SL/d approaches 1.0, thereby decreasing the amount of the particle deposit 53 deposited.

Figure 12:
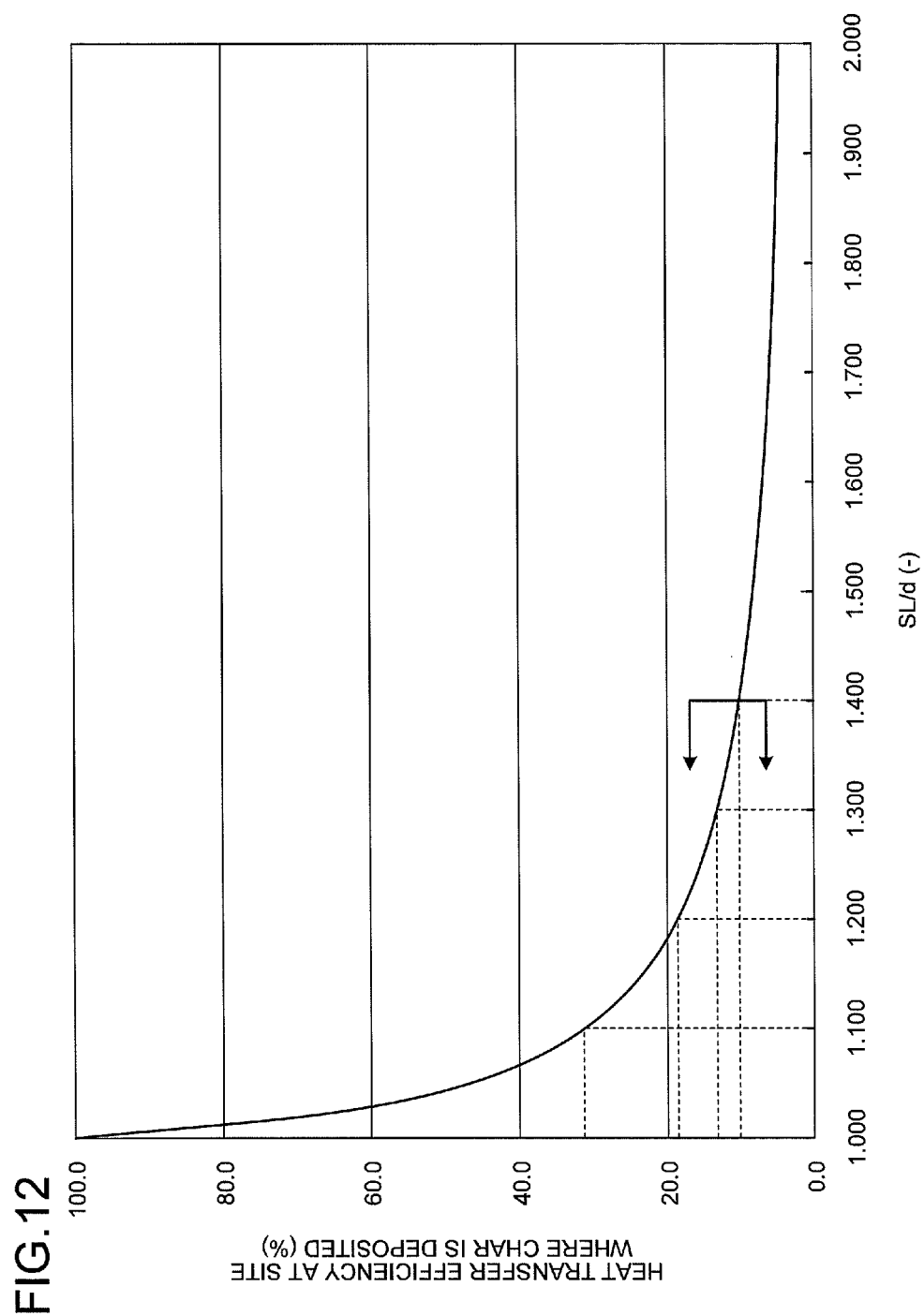
FIG. 12 is a graph illustrating the relationship between SL/d and heat transfer efficiency (%) at a site where char is deposited.
Figure 13:
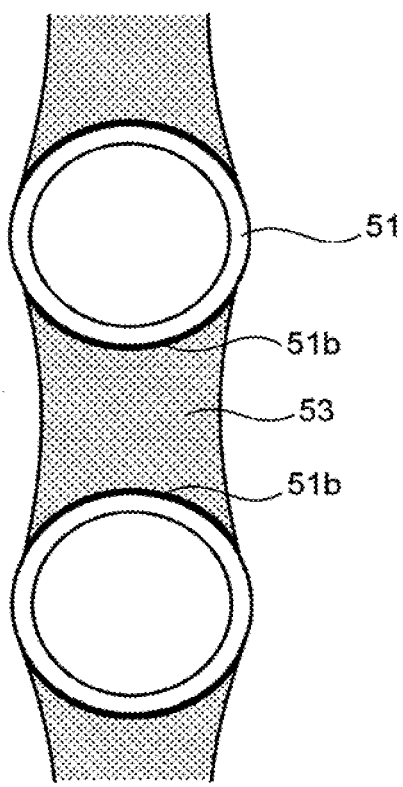
FIG. 13 is a schematic diagram illustrating a deposit state of the particle onto the tube in the heat exchanger.

FIG. 12 is a graph illustrating the relationship between SL/d and heat transfer efficiency (%) at a site where char is deposited. FIG. 13 is a schematic diagram illustrating a deposit state of the particle onto the tube in the heat exchanger.

The graph illustrated in FIG. 12 illustrates the relationship between the value of the SL/d that is varied and the heat transfer efficiency at a site where char is deposited. Now, as illustrated in FIG. 13, a portion 51b of the tube 51 that cannot perform heat exchange due to the particle deposit 53 deposited on the surface of the tube 51 corresponds to the portion susceptible to thermal resistance.

As illustrated in the graph in FIG. 12, the heat transfer efficiency changes little where SL/d>1.4, in which case a further increase in the ratio only increases the height of the pressure vessel. It is therefore preferred that SL/d between the tubes 51 and 51 be set at 1.4 or smaller.

Figure 14:
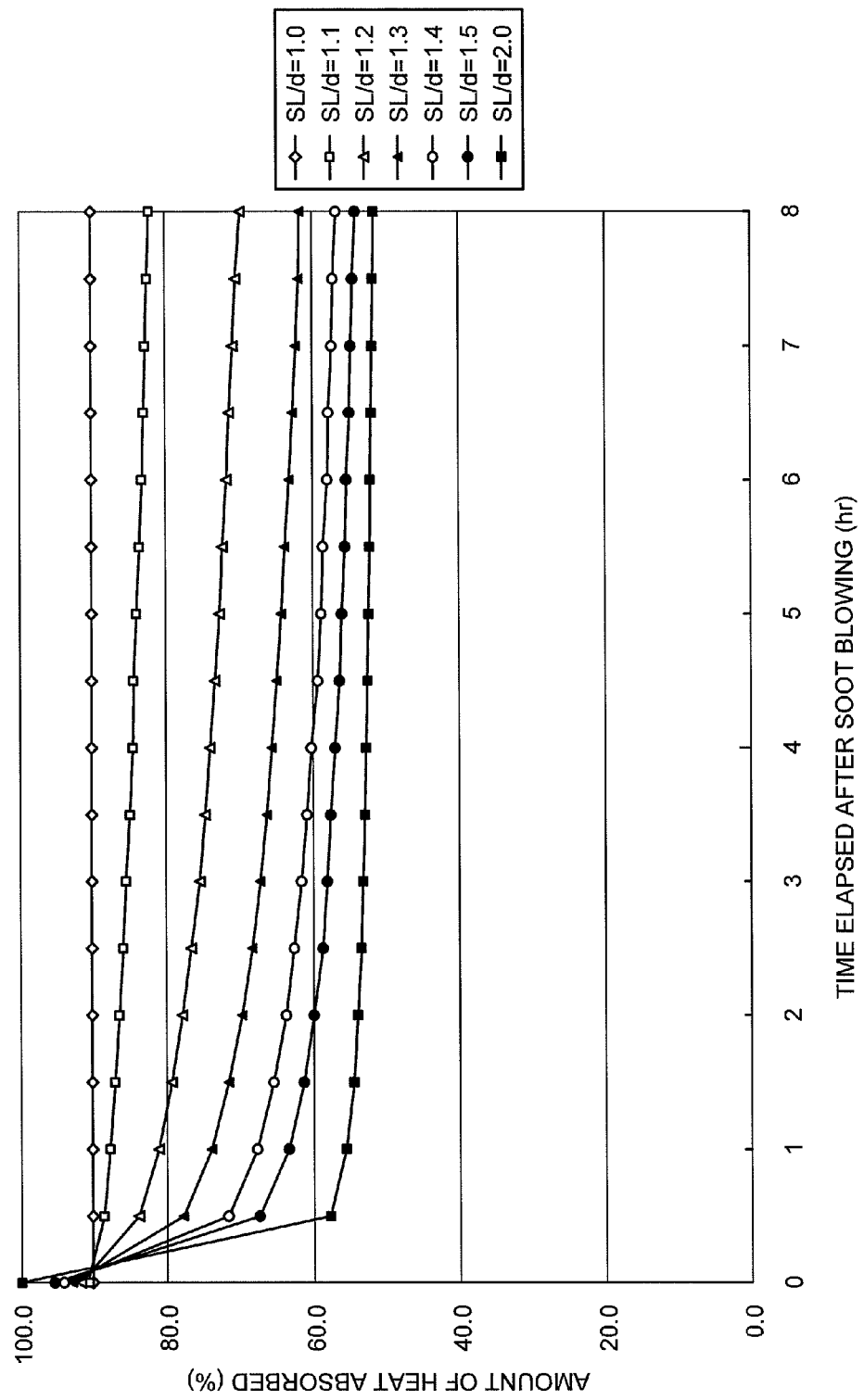
FIG. 14 is a graph illustrating the relationship between the time elapsed after soot blowing and the amount of heat absorbed (%).

FIG. 14 is a graph illustrating the relationship between the time elapsed after soot blowing (hr) and the amount of heat absorbed (%).

As illustrated in FIG. 14, 0 hour corresponds to the time immediately after the soot blower is implemented where the amount of heat absorbed is near 100%. Calculated here is the amount of heat absorbed (%) over the lapse of eight hours when the ratio SL/d is varied to have each value corresponding to 1.0, 1.1, 1.2, 1.3, 1.4, 1.5, and 2.0 after the soot blower is implemented.

As illustrated in FIG. 14, when the ratio SL/d is near 2, the value of the amount of heat absorbed is large at an initial stage immediately after the soot blower is implemented, which is favorable.

It is however confirmed that the smaller the ratio SL/d, the smaller the decrease in the amount of heat absorbed over time.

It is preferred from the result illustrated in FIG. 14 and FIG. 12 that the ratio SL/d be set to 1.4 or smaller. It is more preferred that the ratio SL/d be particularly set to 1.3 or smaller where the amount of heat absorbed equals 60% or greater as illustrated in FIG. 14.

Figure 15:
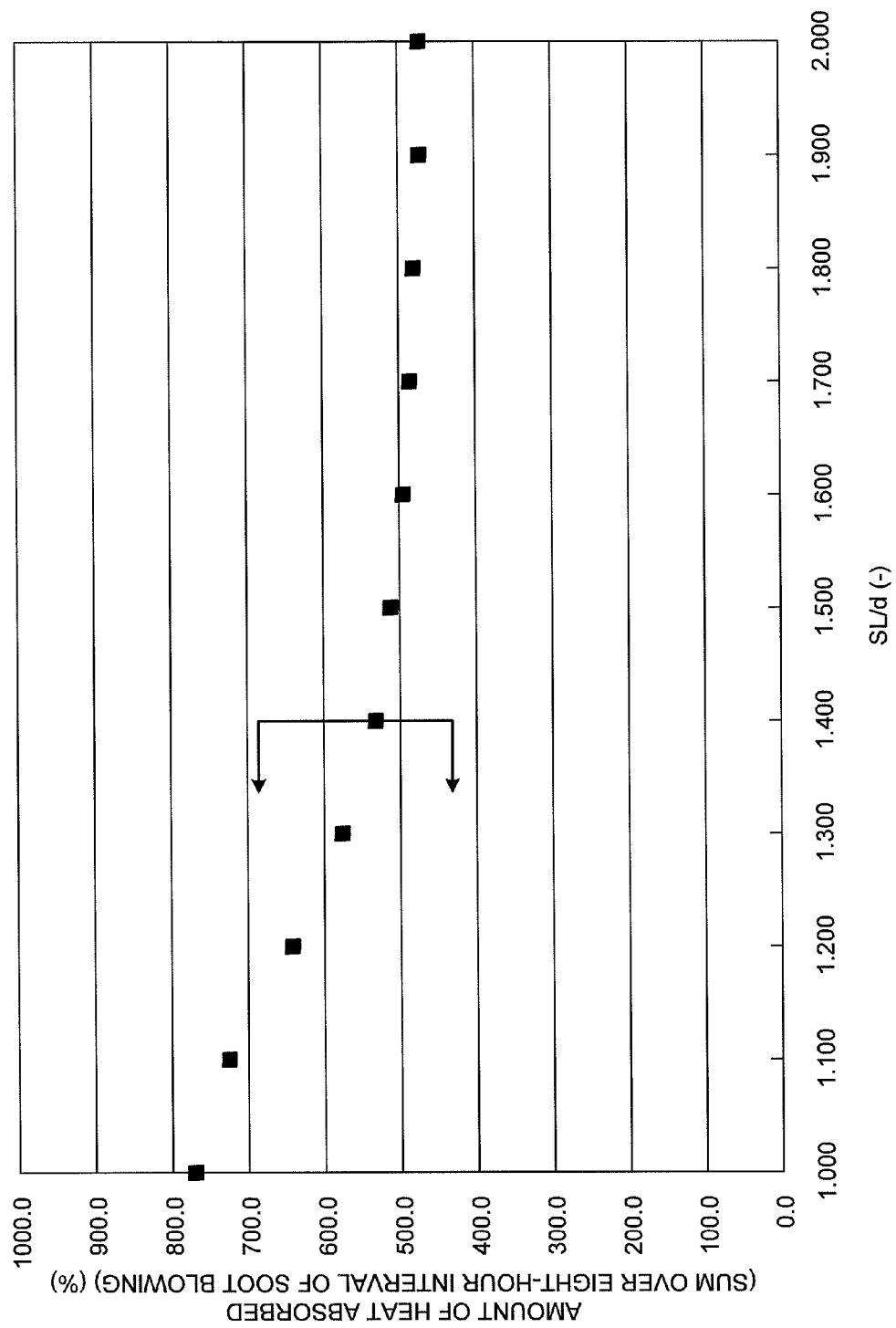
FIG. 15 is a graph illustrating the relationship between SL/d and the amount of heat absorbed (the sum over the eight-hour interval of soot blowing) (%).

FIG. 15 is a graph illustrating the relationship between the ratio SL/d and the amount of heat absorbed (the sum over the eight-hour interval of soot-blowing) (%).

The graph illustrates a case where the soot blower is operated at an interval of eight hours as is applied to the real machine. After eight hours have elapsed, as illustrated in FIG. 15, the smaller SL/d is preferred since the corresponding integrated amount of heat absorbed (%) is larger, whereas the ratio SL/d exceeding 1.4 is not preferred since the corresponding amount of heat absorbed approaches 500%.

Furthermore, the volume of the gas cooler inside the pressure vessel can be made small according to the present invention because the tubes are in contact with each other or adjacent to each other to be a compact tube bundle as a whole.

For example, the height of the tube bundle equals $5d$ where $SL/d=2$ in the tube bundle 50B including tubes arranged in three rows by three columns.

On the other hand, the height of the tube bundle equals $3d$ where $SL/d=1$ in the tube bundle 50A, the height being reduced by approximately 40%.

Letting N be the number of tubes in the height direction, the difference in height between the tube bundle 50B and the tube bundle 50A equals $Nd/(2N-1)d$, where the height is reduced by the substantial amount, approximately 50%, when the N increases (approximately 50 tubes or more).

Here, the amount of particle (char) deposited is examined where the outer diameter of the tube 51 is set to 50 mm, for example. Relative to $SL/d=2$ (100%), as illustrated in FIG. 7, the ratio of the char deposit amount when $SL/d=1.0$ is 18%, achieving a substantial decrease in the particle deposit amount.

FIG. 7 further illustrates that the ratio of the char deposit amount (%) is 26% when the $SL/d$ equals 1.1, 34% when the $SL/d$ equals 1.2, 42% when the $SL/d$ equals 1.3, and 50% when the $SL/d$ equals 1.4. The $SL/d$ exceeding 1.4 is not preferable since the deposit amount increases to 50% or more.

When the heat exchanger with the $SL/d=2$ is installed as has been conventionally, the gas cooler 3b of the coal gasification furnace 3 is constructed as illustrated in FIG. 8 and is almost as tall as the coal gasification part 3a.

When the tubes in the heat exchanger are in contact with each other or adjacent to each other as in the present embodiment, on the other hand, a height $H_1$ of the heat exchanger in the gas cooler 3b illustrated in FIG. 1 is approximately half a height $H_2$ of the heat exchanger illustrated in FIG. 8, whereby the equipment can be made significantly compact.

The difference in the particle deposit amount between the heat exchanger of a conventional, regular boiler facility and the heat exchanger of the coal gasification furnace will be described.

Table 1 illustrates particle concentration in the gasification furnace calculated from the difference in furnace pressure, an excess air ratio, and particle mass between the conventional boiler and the gasification furnace.

TABLE 1

|  | Conventional boiler | Gasification furnace | Ratio of gasification furnace (to conventional boiler which is set to 1) |
| --- | --- | --- | --- |
| Furnace pressure | 1 atm | 30 atm | 30-fold |
| Excess air ratio | 1.20 | 0.4 | three-fold |
| Unreacted residual particle mass in fuel | 10 wt % | 50 wt % (unreacted portion) | five-fold |
| Particle concentration | — | — | 450-fold |

As illustrated in Table 1, the furnace pressure is set to the normal pressure of 1 atm in the conventional boiler and 30 atm in the pressurized gasification furnace, the furnace pressure in which is 30 times that in the conventional boiler.

The excess air ratio is about 1.20 in the conventional boiler and about 0.4 in the gasification furnace performing partial oxidation and gasification, where the ratio in the gasification furnace is approximately three times that in the conventional boiler.

The unreacted residual particle mass in the fuel is 10 wt % in the conventional boiler and 50 wt % in the gasification furnace performing partial oxidation reaction in which the large amount of the fuel is unreacted. The ratio of the value in the gasification furnace is five times that in the conventional boiler.

Multiplying these ratios, the gasification furnace has 450-fold particle concentration.

In a conventional plant under real operation, the heat exchanger of the conventional boiler is subjected to a particle removal operation performed by a dust remover (such as a soot blower) once in about every eight hours.

Assuming the particle removal operation is performed by the similar configuration and method against the heat exchanger of the coal gasification furnace where the particle concentration is significantly increased by 450-fold, the dust removal operation is estimated to be performed once about every minute, which is industrially not viable.

Therefore, the tube bundle configuration more than what is necessary is required in the heat exchanger in order to have a larger heat transfer surface on the assumption that the particle is deposited as described above.

Now, in the present invention when the tube bundle of the heat exchanger in the gas cooler 3b inside the pressure vessel 30 is configured, the tubes 51 and 51 constituting the tube bundle 50A are in contact with each other or adjacent to each other in the gas-flow direction of the produced gas 2 (a vertical direction in FIG. 5), so that the heat transfer surface is equivalent to what has conventionally been while at the same time the pressure vessel of the gasification furnace is made compact by making the height of the gas cooler compact.

As a result, the volume of the pressure vessel is made compact, whereby the gross weight of the gas cooler 3b in the coal gasification furnace is reduced, allowing the strength of a steel frame member supporting the gas cooler to be relaxed accordingly and the installation cost of the facility to be cut down significantly.

Furthermore, the amount of the particle deposit 53 produced when the tubes of the tube bundle are arranged in the conventional checkerboard pattern can also be reduced significantly, so that the frequency of the dust remover (such as the soot blower) being implemented can be decreased while at the same time making a cleaning operation easier when cleaning the deposit in the repairment of the cooling device, allowing a storage facility of the removed particle deposit 53 to be made compact, and reducing the waste itself.

Figure 10:
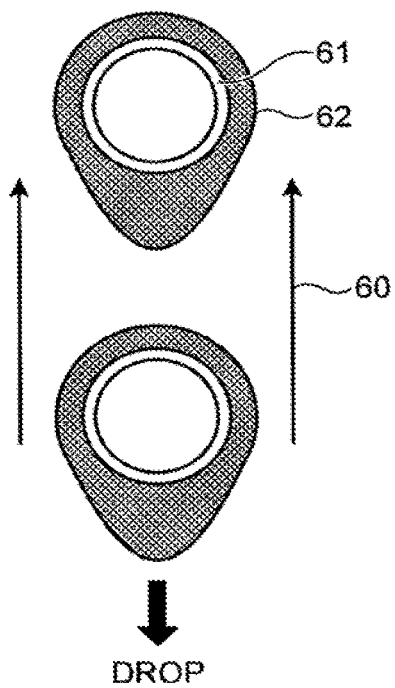
FIG. 10 is a diagram illustrating an arrangement of the tubes in the heat exchanger installed in the upper part of an upper furnace of a conventional boiler.
Figure 11:
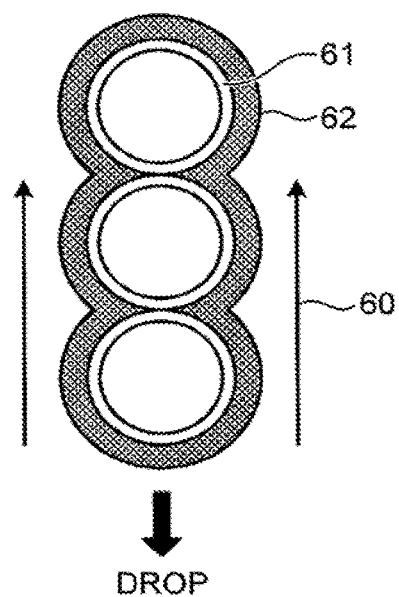
FIG. 11 is a diagram illustrating another arrangement of the tubes in the heat exchanger installed in the upper part of the upper furnace of the conventional boiler.

FIGS. 10 and 11 are diagrams each illustrating the arrangement of tubes in the heat exchanger installed in the upper part of an upper furnace of the conventional boiler.

FIG. 10 illustrates molten ash 62 dropping when the heat exchanger with tubes 61 having $SL/d=2$ are installed in the upper furnace of the conventional boiler. A reference numeral 60 in the figure illustrates a flue gas.

FIG. 11 illustrates a case where the tubes in the heat exchanger are in contact with each other so that the molten ash 62 adhered around the tube 61 runs down efficiently in the upper furnace of the conventional boiler.

Here, the heat transfer surfaces in the conventional boiler are in contact with each other or adjacent to each other in order for the molten ash 62 adhered to the tube 61 in a high temperature region (1300 to 1400° C.) in the upper part of the boiler furnace to easily fall along the tube 61 that is the heat transfer surface down toward a bottom part of the furnace. This is different, in terms of technical ideas, from the tubes in the present invention where the heat exchanger is installed in the region with a great volume of dust in the produced gas 2 which has the temperature equal to the ash melting point or lower (such as 1100° C. or lower) in the pressure vessel 30.

In the present invention, as described above, the tubes 51 and 51 constituting the tube bundle are adjacent to each other (the SL/d is larger than 1 and 1.4 or smaller, for example) in the heat exchanger 36 which performs heat exchange on the produced gas 2 including a great volume of dust under high pressure such as 3 MPa. The temperature of the produced gas 2 passing through the tube bundle within the heat exchanger is 1100 to 1200° C. or lower, where the dust contained in the gas has different quality meaning that it is loose and does not melt and adhere to the tube like the molten ash does under the high temperature of 1300° C. as in the conventional boiler.

The conventional boiler performs complete combustion of coal fuel where the component of a residual, unreacted particle (fly ash) includes 99 to 95 wt % of ash and 1 to 5 wt % of carbon (C) which is a small amount.

On the other hand, the gasification furnace in the present invention performs partial oxidation combustion where the component of a residual, unreacted particle (char) includes 80 wt % or less of ash and 20 wt % or more of carbon (C), indicating the component of the particle is significantly different from that combusted in the conventional boiler.

The amount of dust (char) produced in the gasification part 3a normally falls within the range of 50 to 20,000 g/m$^3$.

Therefore, the tubes 51 and 51 are in contact with each other or adjacent to each other in order to reduce the amount of particle deposited and to eliminate the fluctuation in the decrease of the heat transfer area caused by the deposition of the particle included with a great volume in the produced gas 2 which is introduced into the gas cooler 3b and has the temperature of 1100 to 1200° C. or lower.

As a result, the soot blower or the like is less repeatedly inserted or pulled out into/from the tube bundle of the heat exchanger of the gas cooler 3b inside the pressure vessel 30, thereby also solving the substantial increase in the cost associated with the auxiliary equipment such as the pressure seal.

While the pressure in the pressure vessel 30 is set to 3 MPa in the present embodiment, the present invention is not limited thereto and can also apply a case where the pressure is set to 0.5 MPa or greater and 10 MPa or less.

Second Embodiment

Figure 9:
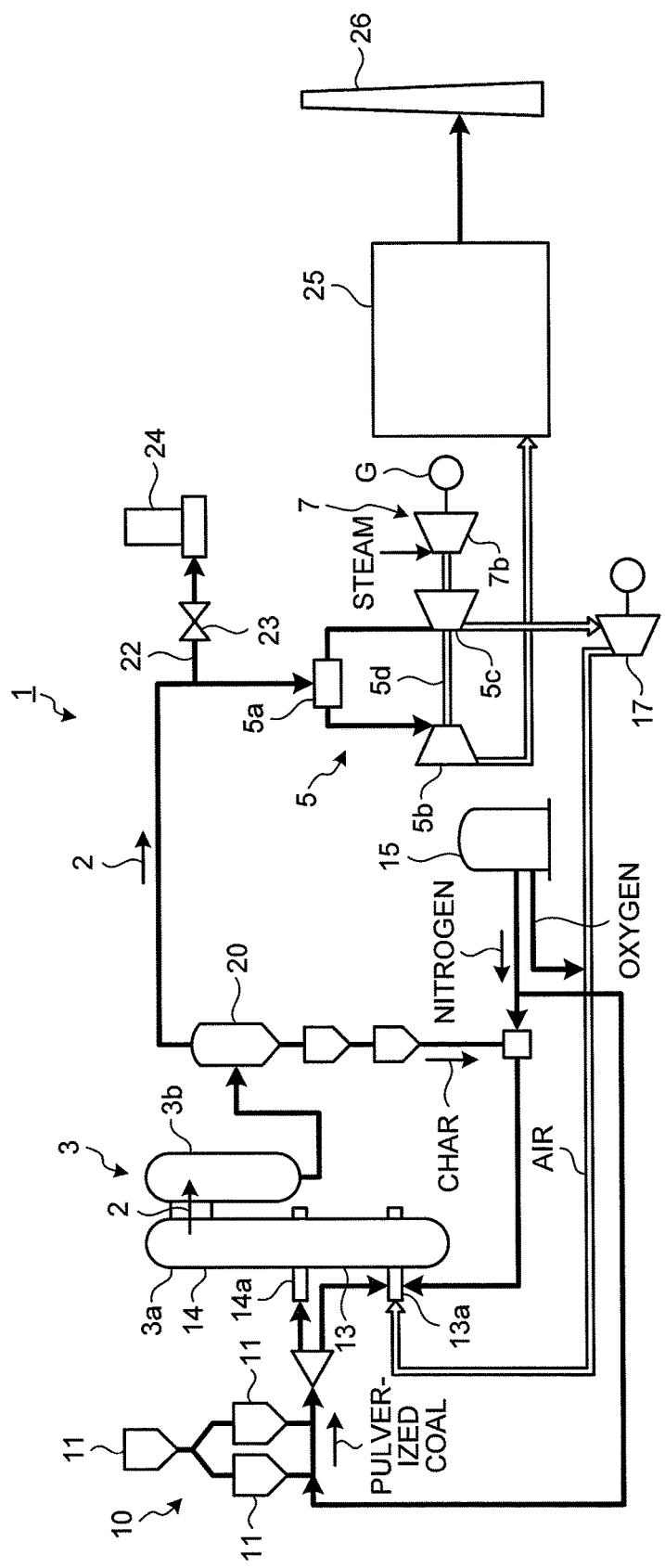
FIG. 9 is a schematic diagram illustrating an integrated gasification combined cycle according to the present embodiment.

Now, one form of an integrated gasification combined facility according to the present embodiment will be described with reference to the drawings. FIG. 9 is a schematic diagram illustrating an integrated coal gasification combined cycle according to the present embodiment. As illustrated in FIG. 9, an integrated coal gasification combined cycle (IGCC) 1 which uses coal or the like as fuel mainly includes a coal gasification furnace 3, gas turbine equipment 5, and steam turbine equipment 7.

Provided on the upstream side of the coal gasification furnace 3 is coal supply equipment 10 which supplies pulverized coal to the coal gasification furnace 3. The coal supply equipment 10 includes a pulverizer (not illustrated) which pulverizes coking coal into pulverized coal of several μm to several hundred μm. The pulverized coal pulverized by the pulverizer is then stored in a plurality of hoppers 11, 11, etc.

The pulverized coal stored in each hopper 11 is delivered to the coal gasification furnace 3 along with nitrogen ($N_2$) that is supplied by a fixed flow rate from an air separation unit 15.

The coal gasification furnace 3 includes: a coal gasification part 3a which is formed to let the gas flow upward from a lower part; and a gas cooler 3b which is connected to the downstream side of the coal gasification part 3a and formed to let the gas flow downward from an upper part.

The coal gasification part 3a is provided with a combustor 13 and a reductor 14 in order from the lower part. The combustor 13 combusts a portion of the pulverized coal and char and lets the rest undergo thermolysis and be discharged as a volatile component (CO, $H_2$, and a lower hydrocarbon). The combustor 13 adopts an entrained bed system but may adopt a fluid bed system or a fixed bed system.

The combustor 13 and the reductor 14 are provided with a combustor burner 13a and a reductor burner 14a, respectively, where pulverized coal is supplied to the burners 13a and 14a from the coal supply equipment 10.

Compressed air from an air booster 17 is supplied to the combustor burner 13a along with oxygen ($O_2$) separated in the air separation unit 15. The air supplied to the combustor burner 13a has adjusted oxygen concentration.

In the reductor 14, the pulverized coal is gasified by the high-temperature flue gas from the combustor 13. As a result, the flammable gas such as CO and $H_2$ is produced from coal. The coal gasification reaction is an endothermic reaction in which carbon in the pulverized coal and char reacts with $CO_2$ and $H_2O$ in the high-temperature gas to produce CO and $H_2$.

A plurality of heat exchangers is installed in the gas cooler 3b of the coal gasification furnace 3 to obtain sensible heat from the gas led from the reductor 14 and generate steam. The steam generated in the heat exchanger is mainly used as steam to drive a steam turbine 7b.

The gas cooler 3b is configured as illustrated in FIG. 1, where the heat exchanger is made compact to have about half the height of the conventional one.

The produced gas 2 having passed the gas cooler 3b is guided to char recovery equipment 20. The char recovery equipment 20 includes a porous filter, through which the produced gas 2 is passed so that the char mixed in the gas is captured and recovered. Together with nitrogen separated in the air separation unit 15, the recovered char is sent back to the combustor burner 13a of the coal gasification furnace 3 and recycled.

The produced gas 2 having passed the char recovery equipment 20 is now sent to a combustor 5a of the gas turbine equipment 5 as a fuel gas.

Provided between the char recovery equipment 20 and the combustor 5a of the gas turbine equipment 5 is a branch path 22 which has an on/off valve 23 and guides the produced gas 2 from the vent side of the coal gasification furnace 3 to a flare system 24.

The gas turbine equipment 5 includes: the combustor 5a in which gasified gas is combusted; a gas turbine 5b powered by the flue gas; and a compressor 5c which sends out high pressure air to the combustor 5a. The gas turbine 5b and the compressor 5c are connected by a single rotating shaft 5d. The air compressed by the compressor 5c is guided to the air booster 17 in addition to the combustor 5a.

The flue gas (flue gas from the gas turbine) having passed the gas turbine 5b is guided to an exhausted heat recovery steam generator (HRSG) 25.

The steam turbine 7b of the steam turbine equipment 7 is connected to the same rotating shaft 5d the gas turbine equipment 5 is connected to, and forms what is called a single-shaft combined system. High pressure steam is supplied to the steam turbine 7b from the coal gasification furnace 3 and the exhausted heat recovery steam generator 25. Note that the single-shaft combined system may be replaced by a separate-shaft combined system.

A generator G outputting electricity from the rotating shaft 5d powered by the gas turbine 5b and the steam turbine 7b is provided on a side opposite from the gas turbine equipment 5 while interposing the steam turbine equipment 7. The generator G may be disposed at any position as long as electricity can be output from the rotating shaft 5d.

The exhausted heat recovery steam generator 25 generates steam by the flue gas from the gas turbine 5b and includes, in the interior of the steam generator, a desulfurization unit which desulfurizes sulfur oxide contained in the flue gas.

The gas having passed the exhausted heat recovery steam generator 25 further passes a wet electric precipitator as needed and is discharged into the atmosphere from a stack 26.

Now, the operation of the integrated coal gasification combined cycle 1 having the aforementioned configuration will be described.

The coking coal pulverized by the pulverizer (not illustrated) is guided to the hopper 11 and stored therein. The pulverized coal stored in the hopper 11 is supplied to the reductor burner 14a and the combustor burner 13a together with nitrogen separated in the air separation unit 15. In addition to the pulverized coal, the char recovered in the char recovery equipment 20 is supplied to the combustor burner 13a.

The combustion air used in the combustor burner 13a is formed by adding oxygen separated in the air separation unit 15 to the compressed air that is extracted from the compressor 5c and further boosted by the air booster 17. The pulverized coal and char are partially combusted by the combustion air in the combustor 13, and the remaining portion is subjected to thermolysis to be the volatile component (CO, $H_2$, and lower hydrocarbon).

In the reductor 14, the pulverized coal supplied from the reductor burner 14a and the char, the volatile component of which is discharged in the combustor 13, are gasified by the high-temperature gas risen from the combustor 13, whereby the flammable gas such as CO and $H_2$ is produced.

The gas having passed the reductor 14 provides sensible heat to each heat exchanger while passing through the gas cooler 3b of the coal gasification furnace 3, thereby generating steam. The steam generated in the gas cooler 3b is mainly used to power the steam turbine 7b.

The tubes constituting the tube bundle are in contact with each other or adjacent to each other in the heat exchanger of the gas cooler 3b so that there is less particle deposit while keeping the heat transfer surface equal to what has been conventionally.

The produced gas 2 having passed the gas cooler 3b is guided to the char recovery equipment 20, in which the char is recovered. The recovered char is sent back to the coal gasification furnace 3.

The produced gas 2 having passed the char recovery equipment 20 is then guided to the combustor 5a of the gas turbine equipment 5 and combusted with the compressed air supplied from the compressor 5c. Accordingly, the gas turbine 5b is rotated by the flue gas, thereby driving the rotating shaft 5d.

The flue gas having passed the gas turbine 5b is guided to the exhausted heat recovery steam generator 25 where the sensible heat of the flue gas is used to generate steam. The steam generated in the exhausted heat recovery steam generator 25 is mainly used to power the steam turbine 7b.

The steam turbine 7b is rotated by the steam from both the coal gasification furnace 3 and the exhausted heat recovery steam generator 25 and drives the rotating shaft 5d that is used in the gas turbine equipment 5 as well. The rotational force of the rotating shaft 5d is converted into electrical output by the generator G.

The flue gas having passed the exhausted heat recovery steam generator 25 is subjected to desulfurization in the desulfurization unit by which sulfur content is removed. The purified flue gas is thereafter discharged into the atmosphere from the stack 26.

While the present embodiment has described an oxygen combustion system where oxygen is used as an oxidizing agent, the present invention is not limited thereto and can also apply an air combustion (also referred to as "air blown") system in which air is used as the oxidizing agent instead of oxygen.

While the present embodiment has been described by using the carbon-containing fuel coal as an example, the fuel supplied to the gasification furnace and partially oxidized according to the present invention is not limited to coal. For example, any fuel containing a carbonaceous component such as brown coal, heavy oil, petroleum coke, biomass, or natural gas may be used.

While the present embodiment has described the integrated gasification combined cycle (IGCC) as an example, the produced gas that is partially oxidized in the gasification furnace by using the carbon-containing fuel may be applied to obtain a chemical raw material for a liquid fuel such as methanol ($CH_3OH$) or a fuel gas such as methane ($CH_4$).

REFERENCE SIGNS LIST 1 integrated gasification combined cycle (IGCC)
2 produced gas
3 coal gasification furnace
3a coal gasification part
3b gas cooler
5 gas turbine equipment
7 steam turbine equipment
25 exhausted heat recovery steam generator (HRSG)
26 stack
30 pressure vessel
50 tube bundle
51 tube
52 particle
53 particle deposit
G generator

The invention claimed is:
1. A pressure vessel comprising:
a gasification furnace that partially oxidizes and gasifies a pulverized coal and discharges gasified gas as a produced gas; and
a gas cooler including a flue gas duct that communicates with the gasification furnace and through which the produced gas passes, wherein
the gas cooler includes a heat exchanger provided in the flue gas duct, the heat exchanger including a group of tubes arrayed along a gas-flow direction of the produced gas passing through the flue gas duct, and a ratio (SL/d) of a distance (SL) in the gas-flow direction of the produced gas between the tubes constituting the group of tubes to an outer diameter (d) of the tube is larger than 1 and 1.4 or smaller, such that dust particles of the produced gas are deposited only in a concave portion between the tubes.

2. The pressure vessel according to claim 1, wherein a temperature of the produced gas inside the gas cooler is equal to an ash melting point or lower, and a dust concentration of the produced gas from the gasification furnace falls within a range of 50 $g/m^3$ to 20,000 $g/m^3$.

3. The pressure vessel according to claim 1, wherein pressure inside the pressure vessel is 0.5 MPa to 10 MPa.

4. An integrated gasification combined cycle for a carbon-containing fuel comprising:

the pressure vessel according to claim 1;

a gas turbine equipment to which the produced gas obtained in the pressure vessel is supplied as a fuel; and an exhausted heat recovery steam generator for recovering exhausted heat from a flue gas generated from the gas turbine equipment.

5. The integrated gasification combined cycle for a carbon-containing fuel according to claim 4, further comprising a steam turbine equipment to which obtained steam is supplied.

\* \* \* \* \*